(12) United States Patent
Kimura et al.

(10) Patent No.: US 11,897,319 B2
(45) Date of Patent: Feb. 13, 2024

(54) VEHICLE DOOR FRAME

(71) Applicant: AISIN CORPORATION, Aichi (JP)

(72) Inventors: Jun Kimura, Kanagawa (JP); Takashi Kameyama, Kanagawa (JP)

(73) Assignee: AISIN CORPORATION, Aichi (JP)

( * ) Notice: Subject to any disclaimer, the term of this patent is extended or adjusted under 35 U.S.C. 154(b) by 105 days.

(21) Appl. No.: 17/274,679

(22) PCT Filed: Sep. 17, 2019

(86) PCT No.: PCT/JP2019/036360
§ 371 (c)(1),
(2) Date: Mar. 9, 2021

(87) PCT Pub. No.: WO2020/075452
PCT Pub. Date: Apr. 16, 2020

(65) Prior Publication Data
US 2022/0032754 A1   Feb. 3, 2022

(30) Foreign Application Priority Data
Oct. 10, 2018  (JP) .................. 2018-192129

(51) Int. Cl.
*B60J 5/04* (2006.01)
(52) U.S. Cl.
CPC ........... *B60J 5/0402* (2013.01); *B60J 5/0463* (2013.01)
(58) Field of Classification Search
CPC ........ B60J 5/0463; B60J 5/0402; B60R 13/04
See application file for complete search history.

(56) References Cited

U.S. PATENT DOCUMENTS 7,390,049 B2 * 6/2008 Nishikawa ............. B60J 5/0402
296/146.1
8,172,125 B2 * 5/2012 Okada .................... B60J 5/0402
228/256

(Continued)

FOREIGN PATENT DOCUMENTS

JP      S53116626 A     10/1978
JP      2000312968 A    11/2000

(Continued)

OTHER PUBLICATIONS

English translation of Japanese Patent JP2013244939-A from WIPO (Year: 2013).*

(Continued)

*Primary Examiner* — Janet M Wilkens
*Assistant Examiner* — Susan M. Heschel
(74) *Attorney, Agent, or Firm* — BUCHANAN INGERSOLL & ROONEY PC

(57) ABSTRACT

A vehicle door frame includes a pillar, a frame molding, and a welded part. The pillar has a first abutting surface and a first outer surface. The upper frame has a second abutting surface and a second outer surface. The frame molding extends along the upper frame to cover an outside of the upper frame in the lateral direction of a vehicle, and has an inner surface facing the first outer surface and the second outer surface with a gap. The welded part is located at a boundary between the first outer surface and the second outer surface, extends along the first abutting surface and the second abutting surface, faces the inner surface, and bonds the pillar and the upper frame together.

4 Claims, 12 Drawing Sheets

(56) References Cited

U.S. PATENT DOCUMENTS

| | | | |
|---|---|---|---|
| 8,978,309 B2* | 3/2015 | Goto | E06B 9/42 |
| | | | 296/145 |
| 8,979,167 B2* | 3/2015 | Shimizu | B60J 5/0402 |
| | | | 49/502 |
| 8,985,673 B2* | 3/2015 | Yamada | B60J 5/0402 |
| | | | 296/146.5 |
| 10,583,716 B2* | 3/2020 | Bito | B60J 5/0402 |
| 2004/0006923 A1* | 1/2004 | Nakanishi | B60R 13/04 |
| | | | 49/374 |
| 2016/0221422 A1* | 8/2016 | Endo | B60R 13/04 |
| 2018/0229670 A1* | 8/2018 | Bito | B60R 13/04 |

FOREIGN PATENT DOCUMENTS

| | | | |
|---|---|---|---|
| JP | 2002283933 A | | 10/2002 |
| JP | 2003112525 A | | 4/2003 |
| JP | 2013244939 A | * | 12/2013 |
| JP | 2013244939 A | | 12/2013 |
| JP | 2015229391 A | | 12/2015 |

OTHER PUBLICATIONS

English translation of JP2002283933-A from WIPO (Year: 2002).*
International Search Report (PCT/ISA/210) and Written Opinion (PCT/ISA/237) dated Oct. 21, 2019, by the Japanese Patent Office as the International Searching Authority for International Application No. PCT/JP2019/036360.

* cited by examiner

VEHICLE DOOR FRAME

CROSS-REFERENCE TO RELATED APPLICATIONS

This application is a national stage application of International Application No. PCT/JP2019/036360, filed Sep. 17, 2019, which designates the United States, incorporated herein by reference, and which claims the benefit of priority from Japanese Patent Application No. 2018-192129, filed Oct. 10, 2018, the entire contents of which are incorporated herein by reference.

TECHNICAL FIELD

Embodiments described herein relate generally to a vehicle door frame.

BACKGROUND ART

Traditionally, vehicle door frames are known, which include an upper frame and a pillar welded together at the upper rear corner.

In such a vehicle door frame, the welded part between the upper frame and the pillar may be located close to the upper or lower edge of the upper frame. In such a case, a weld bead arising from the welded part is to be accurately cut or polished for the purpose of avoiding interference between the weld bead and the peripheral components around the upper frame. This may cause inconveniences such as an increase in manufacturing work and time.

MEANS FOR SOLVING PROBLEM

It is an object of the present invention to provide a vehicle door frame that can reduce inconveniences arising from closeness of the welded part between an upper frame and a pillar to the upper edge or the lower edge of the upper frame, for example.

SUMMARY

According to the present invention, for example, a vehicle door frame includes a pillar having a first abutting surface being located at an upper corner of a vehicle door, and a first outer surface facing outward in a lateral direction of a vehicle; an upper frame having a second abutting surface being located at the corner and abutting against the first abutting surface, and a second outer surface facing outward in the lateral direction of the vehicle and being adjacent to the first outer surface; a frame molding extending along the upper frame to cover an outside of the upper frame in the lateral direction of the vehicle, and having an inner surface facing the first outer surface and the second outer surface with a gap; and a welded part being located at a boundary between the first outer surface and the second outer surface, extending along the first abutting surface and the second abutting surface, facing the inner surface, and bonding the pillar and the upper frame together. The welded part has at least one of an upper end and a lower end, the upper end being spaced downward from an upper edge of the upper frame, the lower end being spaced upward from a lower edge of the upper frame.

In the vehicle door frame, for example, the second outer surface is a flat surface or an outwardly curved surface in the lateral direction of the vehicle. The upper frame has an upper end surface being an upwardly curved surface smaller in radius of curvature than the second outer surface, and forming the upper edge; a lower end surface being a downwardly curved surface smaller in radius of curvature than the second outer surface, and forming the lower edge; an upper boundary between the second outer surface and the upper end surface; and a lower boundary between the second outer surface and the lower end surface. The welded part includes at least one of the upper end located at or below the upper boundary, and the lower end located at or above the lower boundary.

The vehicle door frame includes, for example, an intervenient object being spaced apart from the second abutting surface and interposed between the second outer surface and the inner surface.

The vehicle door frame includes, for example, an end cap including a lid that covers an end of the frame molding, and an intervenient part being interposed between at least one of the first outer surface and the second outer surface and the inner surface.

In the vehicle door frame, for example, the welded part extends in an oblique direction intersecting a vertical direction and a horizontal direction.

In the vehicle door frame, for example, the upper frame includes an upright wall extending vertically and in a longitudinal direction of the upper frame; and a hook that catches a weather strip, the hook projecting inward in the lateral direction of the vehicle from a location below the upper edge of the upright wall. A first position opposite to the upper end of the welded part across the upright wall is located below the upper surface or between an upper surface of the hook and a second position opposite to the upper boundary across the upright wall.

In the vehicle door frame, for example, the welded part includes a weld bead.

According to the vehicle door frame, for example, the welded part is spaced from at least one of the upper edge and the lower edge of the upper frame. This can avoid inconveniences arising from the closeness of the welded part to the upper edge or the lower edge of the upper frame.

DESCRIPTION OF EMBODIMENTS

Figure 1:
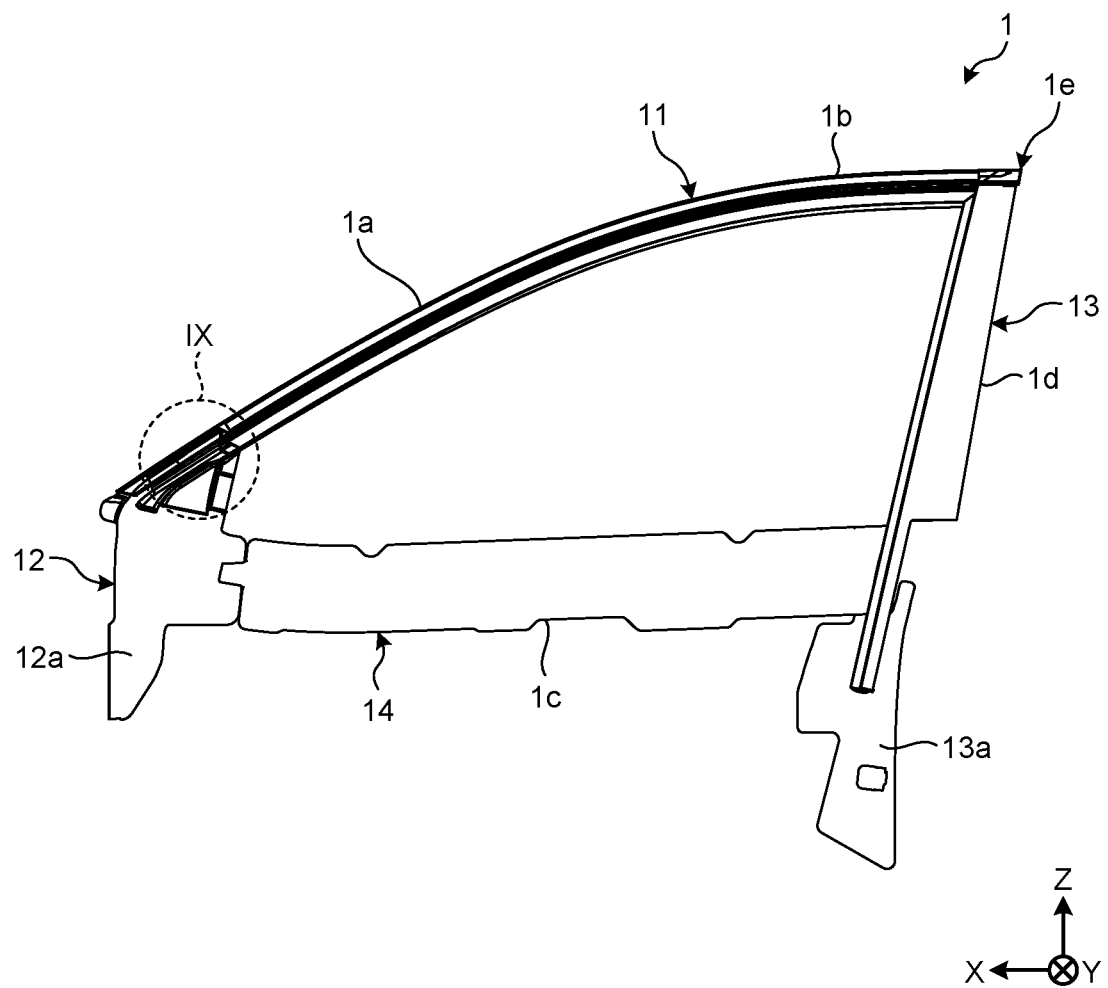
FIG. 1 is a schematic and exemplary side view of a vehicle door frame according to an embodiment as viewed from the outside of a vehicle in a lateral direction.

The following will describe an exemplary embodiment of the present invention. The features of the embodiment to be described below and functions and results (effects) of such features are presented for illustrative purposes only. The present invention can be implemented by other features than those disclosed in the embodiment below. The present invention can attain at least one of the effects (including derivative effects) attainable by the features. Throughout the specification, ordinal numbers are used to distinguish parts, components, portions, positions, direction, and else for ease of discussion, and thus are not intended to indicate any priority or order.

In the drawings, direction are defined for the sake of convenience. The letter X indicates a forward direction of a vehicle longitudinal direction. The letter Y indicates a rightward direction of a vehicle lateral direction. The letter Z indicates an upward direction of a vehicle vertical direction. The vehicle longitudinal direction, the vehicle lateral direction, and the vehicle vertical direction intersect (are orthogonal to) one another.

FIG. 1 is a side view of a front door frame 1 as viewed from the outside of the vehicle in the lateral direction. As illustrated in FIG. 1, the front door frame 1 includes an upper frame 11 forming a front edge 1a and an upper edge 1b, a lower member 12 forming a front bottom of the front door frame 1, a pillar 13 forming a rear edge 1d, a waist reinforcement 14 forming a bottom edge 1c. The front door frame 1 is an example of a vehicle door frame.

The upper frame 11, the lower member 12, the pillar 13, and the waist reinforcement 14 are, for example, formed of a metal material such as an aluminum alloy or a ferrous metal. The upper frame 11 can be formed of an aluminum alloy by extrusion molding, for example. The lower member 12, the pillar 13, and the waist reinforcement 14 can be formed of, for example, one or more metal plates by bending or bonding. Alternatively, they may be cast components.

The front end (lower end) of the upper frame 11 and the upper end (rear end) of the lower member 12 are bonded together by welding. The upper frame 11 and the pillar 13 are bonded together at the upper corner 1e by welding.

The lower member 12 and the pillar 13 are provided with stationary parts 12a and 13a in their bottom parts. The stationary parts 12a and 13a are bonded to a door panel (not illustrated), for example, by welding. The stationary parts 12a and 13a can also be referred to as brackets. The stationary parts 12a and 13a serve to enhance the rigidity and the strength of the door panel. In this regard, the stationary parts 12a and 13a can also be referred to as reinforcements.

Figure 2:
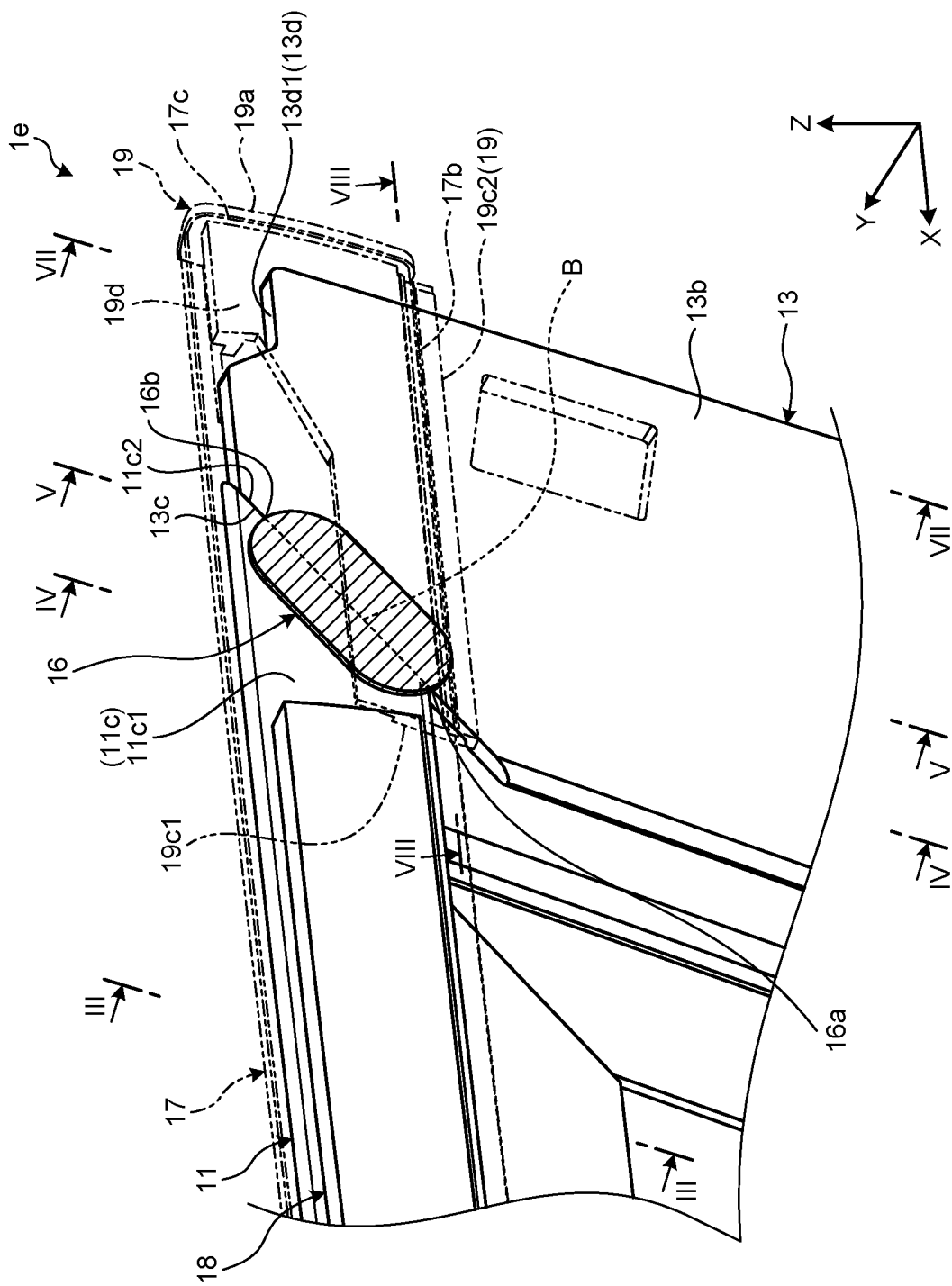
FIG. 2 is a schematic and exemplary perspective view of an upper corner of the vehicle door frame according to the embodiment as viewed from the outside of the vehicle in the lateral direction.
Figure 3:
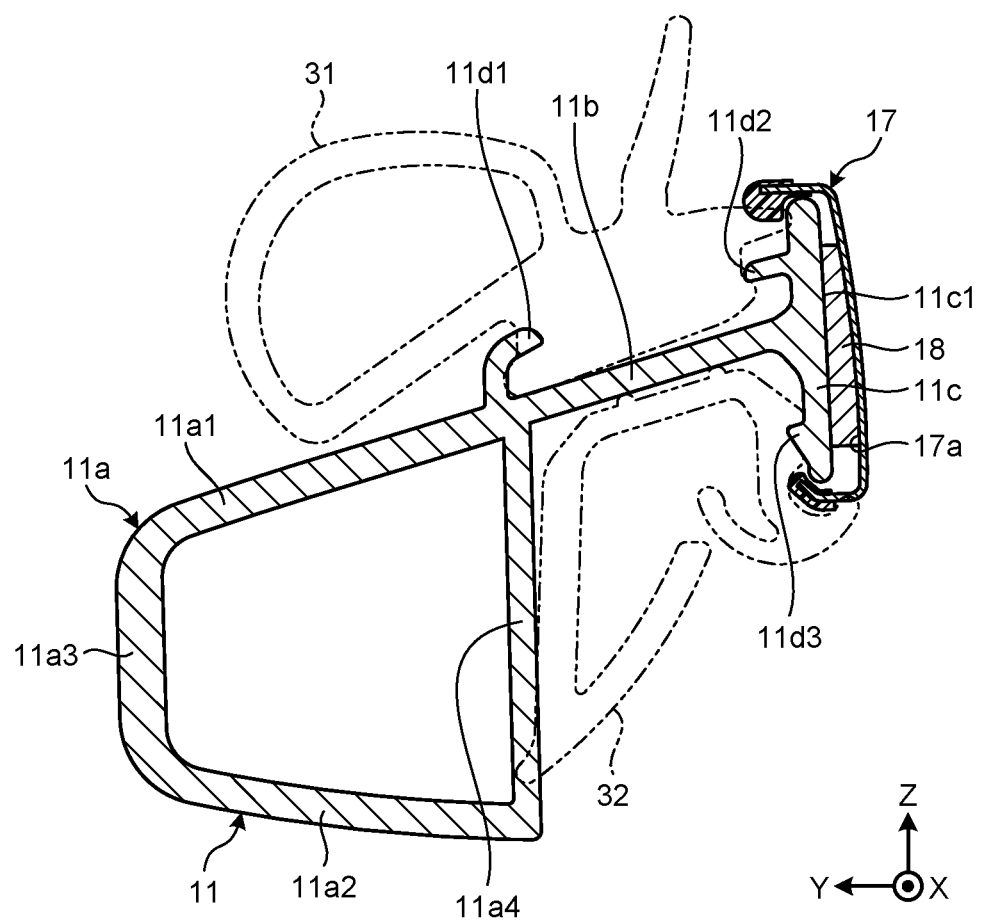
FIG. 3 is a sectional view taken along the line III-III of FIG. 2.

FIG. 2 is a perspective view of the front door frame 1 as viewed from the outside of vehicle in the lateral direction, and FIG. 3 is a sectional view taken along the line III-III of FIG. 2.

As illustrated in FIG. 2, in the upper corner 1e the upper frame 11 extends substantially in the longitudinal direction of the vehicle. The upper frame 11 is formed of an aluminum alloy by extrusion molding, for example. The cross section of the upper frame 11 intersecting the longitudinal direction is substantially the same as the section illustrated in FIG. 3 regardless of the location of the upper frame 11 in the longitudinal direction.

As illustrated in FIG. 3, the upper frame 11 includes a closed cross section 11a, a bridging wall 11b, and an upright wall 11c. The closed cross section 11a includes an upper wall 11a1, a lower wall 11a2, an inner wall 11a3, and an outer wall 11a4. The bridging wall 11b adjoins the outside of the closed cross section 11a in the vehicle lateral direction, and the upright wall 11c adjoins the outside of the bridging wall 11b in the vehicle lateral direction. The upper wall 11a1 of the closed cross section 11a and the bridging wall 11b extend continuously with each other. The upper wall 11a1 and the bridging wall 11b extend upward as extending outward in the vehicle lateral direction and are thus slightly tilted with respect to the vehicle lateral direction. A vertically intermediate part of the upright wall 11c and the lateral outer end of the bridging wall 11b are coupled to each other. That is, the bridging wall 11b and the upright wall 11c form a substantially T-shaped section.

The upper side of the bridging wall 11b has a weather strip 31 attached thereto. A glass run 32 is attached to the bottom of the bridging wall 11b. The weather strip 31 and the glass run 32 are both formed of, for example, elastomer. The weather strip 31 is hooked by a protrusion 11d1 projecting upward from the upper wall 11a1 and by a protrusion 11d2 projecting inward in the vehicle lateral direction from a part of the upright wall 11c above the bridging wall 11b. The glass run 32 is hooked by a protrusion 11d3 projecting inward in the vehicle lateral direction from a part of the upright wall 11c below the bridging wall 11b. The protrusions 11d1, 11d2, and 11d3 extend in the longitudinal direction of the upper frame 11. The protrusion 11d2 is an example of a hook that catches the weather strip 31.

As illustrated in FIG. 2, the upper frame 11 includes an outer surface 11c1 and a rear end surface 11c2 of the upright wall 11c. The pillar 13 has an outer surface 13b and an upper front end surface 13c. The outer surface 13b is an example of a first outer surface, and the outer surface 11c1 is an example of a second outer surface.

As viewed in the vehicle lateral direction, the end surface 11c2 of the upper frame 11 and the end surface 13c of the pillar 13 extend obliquely upward toward the rear. The end surface 11c2 is a flat surface facing in a direction between the rearward direction and the downward direction of the vehicle. The end surface 13c is a flat surface facing in a direction between the frontward direction and the upward direction of the vehicle. The end surface 11c2 and the end surface 13c abut against each other. The end surface 13c is an example of a first abutting surface. The end surface 11c2 is an example of a second abutting surface.

The outer surface 11c1 of the upper frame 11 and the outer surface 13b of the pillar 13 both face outward in the vehicle lateral direction and are substantially flush with each other. That is, the outer surface 11c1 and the outer surface 13b are adjacent to each other with substantially no unevenness.

The upper frame 11 and the pillar 13 are bonded together by welding such as arc welding. A weld bead 16 is formed as a result of welding at a boundary B between the outer surface 11c1 and the outer surface 13b, that is, at the abutting part between the end surface 11c2 and the end surface 13c. The weld bead 16 extends upward at a given width along the boundary B while extending toward the rear. The weld bead 16 projects outward from the outer surfaces 11c1 and 13b in the vehicle lateral direction. The weld bead 16 is an example of a welded part.

Figure 4:
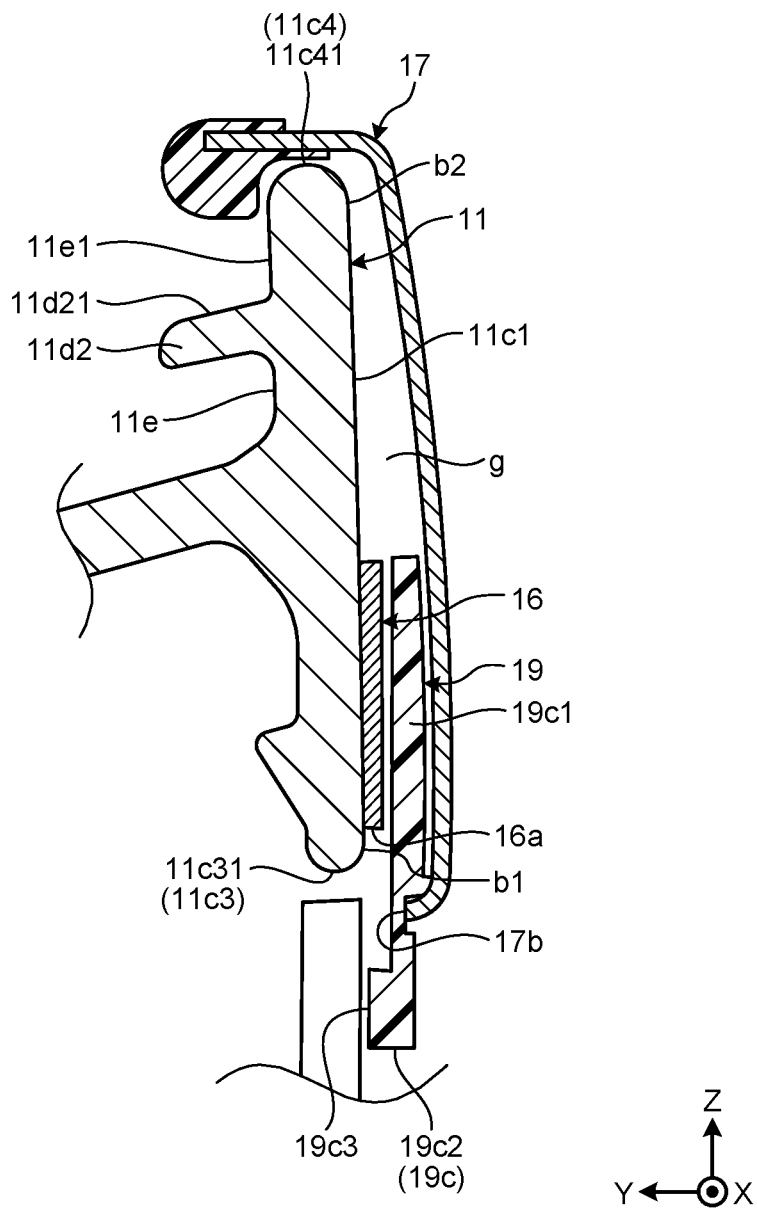
FIG. 4 is a sectional view taken along the line IV-IV of FIG. 2.
Figure 5:
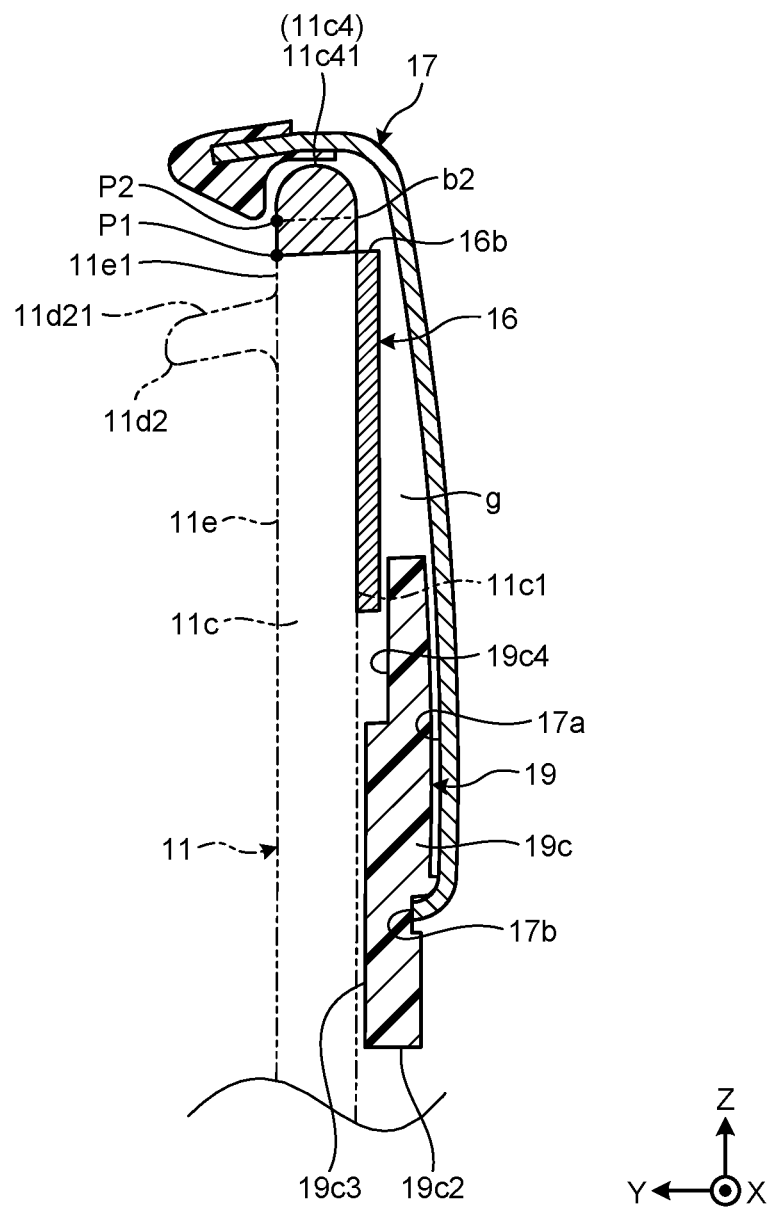
FIG. 5 is a sectional view taken along the line V-V of FIG. 2.

FIG. 4 is a sectional view taken along the line IV-IV of FIG. 2, and FIG. 5 is a sectional view taken along the line V-V of FIG. 2. As can be seen in FIG. 2, FIG. 4 is a sectional view of the neighborhood of a lower end 16a of the weld bead 16, and FIG. 5 is a sectional view of the neighborhood of an upper end 16b of the weld bead 16.

As illustrated in FIG. 4, a lower edge 11c3 of the upright wall 11c of the upper frame 11 is rounded and has a downwardly curved surface 11c31. As illustrated in FIGS. 4 and 5, an upper edge 11c4 of the upright wall 11c is rounded and has an upwardly curved surface 11c41. The outer surface 11c1 of the upright wall 11c is a flat surface or an outwardly curved surface in the vehicle lateral direction. The outwardly curved surface is approximate to a flat surface and has a much larger curvature than the curved surfaces 11c31 and 11c41 in a cross section perpendicular to the longitudinal direction of the upper frame 11. The curved surfaces 11c31 and 11c41 are smaller in radius of curvature than the outer surface 11c1. In the present embodiment, the curved surface 11c31 of the lower edge 11c3 and the curved surface 11c41 of the upper edge 11c4 extend from outward to inward in the vehicle lateral direction. However, the present embodiment is not limited thereto as long as the curved surfaces 11c31 and 11c41 adjoin the outer surface 11c1. The outer surface 11c1 is an example of a second outer surface, the curved surface 11c31 is an example of a lower end surface, and the curved surface 11c41 is an example of an upper end surface.

As illustrated in FIGS. 2 to 5, the upright wall 11c is covered by a frame molding 17, and so is the outside of the upper corner 1e in the vehicle lateral direction.

The frame molding 17 has a plate-like shape and extends along the outer surface 11c1 of the upright wall 11c. The frame molding 17 extends from below the lower edge 11c3 of the upright wall 11c to above the upper edge 11c4 of the upright wall 11c.

There is a gap g between the outer surface 11c1 of the upright wall 11c and an inner surface 17a of the frame molding 17. A component (intervenient component) is interposed in the gap.

As illustrated in FIGS. 2 and 3, a sponge 18 is interposed between the outer surface 11c1 and the inner surface 17a ahead of the weld bead 16. The sponge 18 is attached onto the outer surface 11c1, for example, by adhesive bonding. In the free state the sponge 18 has a substantially uniform height (thickness) on the outer surface 11c1. The sponge 18 has a substantially uniform width in the lateral direction perpendicular to the longitudinal direction of the outer surface 11c1, and extends in the longitudinal direction of the outer surface 11c1. The sponge 18 is an example of an intervenient object. The sponge 18 can also be referred to as a foaming component, an elastic component, or a flexible component.

As illustrated in FIGS. 2, 4, and 5, in the upper corner 1e, an end cap 19 is partially interposd between the outer surface 11c1 of the upright wall 11c and the outer surface 13b of the pillar 13, and the inner surface 17a of the frame molding 17.

Figure 6:
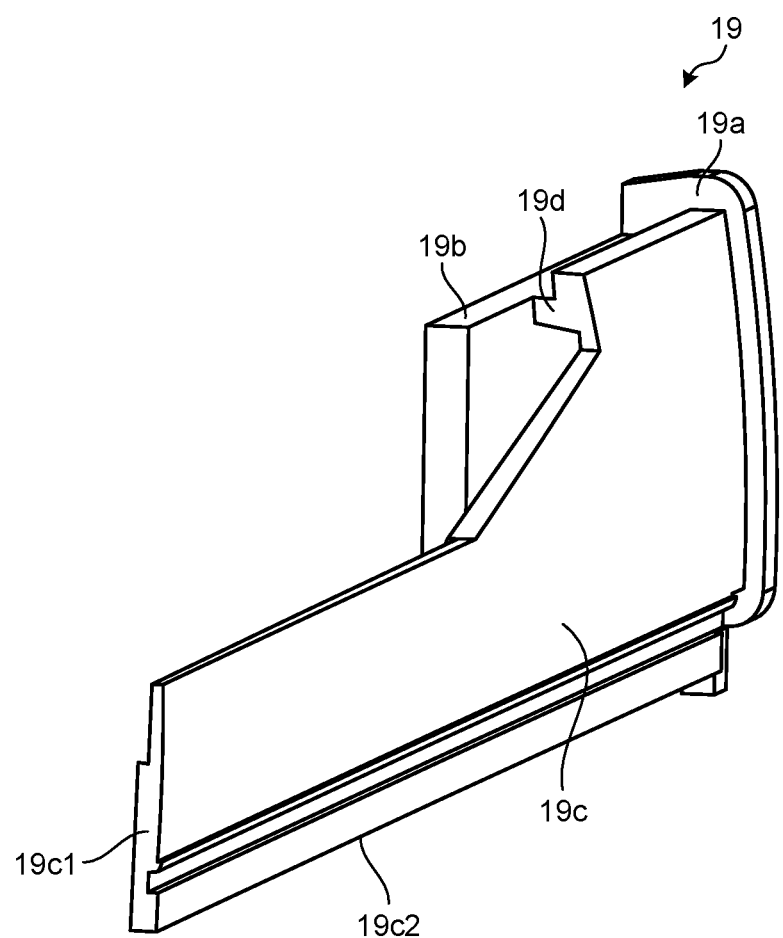
FIG. 6 is a perspective view of an end cap attached to the vehicle door frame according to the embodiment.
Figure 7:
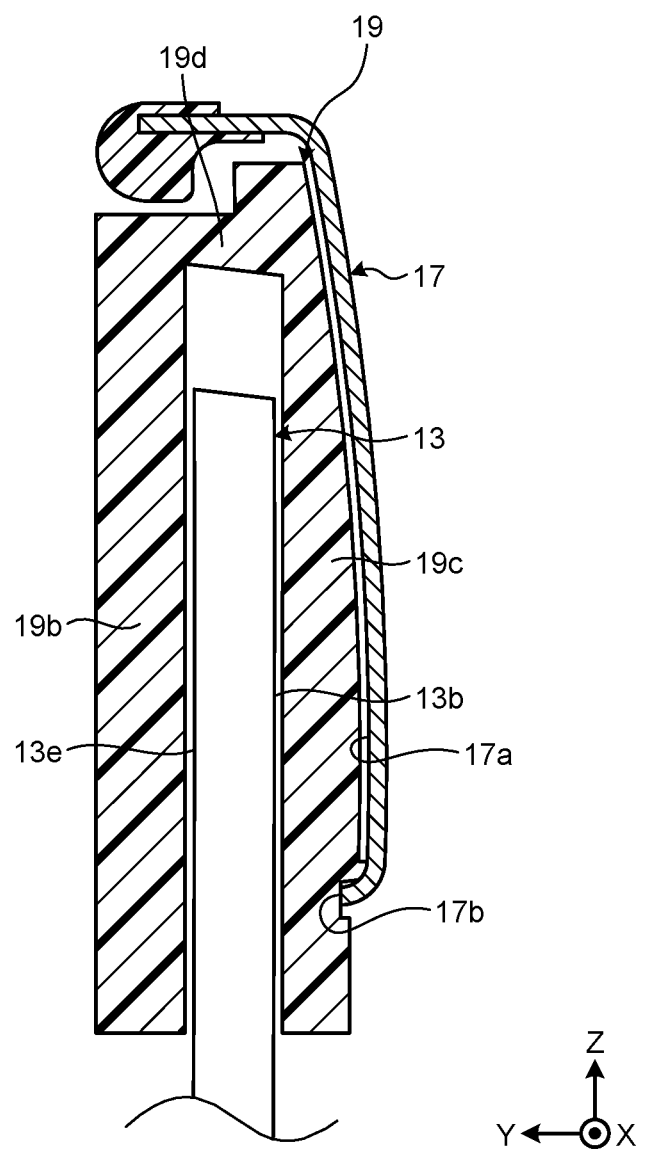
FIG. 7 is a sectional view taken along the line VII-VII of FIG. 2.

FIG. 6 is a perspective view of the end cap 19, and FIG. 7 is a sectional view taken along the line VII-VII of FIG. 2. The end cap 19 has a substantially U-shape as viewed from the front side, and extends along the frame molding 17 more inside than the frame molding 17 in the vehicle lateral direction. The end cap 19 is attached to the pillar 13, covering the pillar 13 from above. The end cap 19 includes a lid 19a, an inner wall 19b, an outer wall 19c, and a connection 19d. The lid 19a has a plate-like shape, and expands in a direction intersecting the longitudinal direction of the pillar 13 and the longitudinal direction of the frame molding 17. The lid 19a covers a rear end 17c of the frame molding 17 as illustrated in FIG. 2. As illustrated in FIG. 7, the inner wall 19b extends downward from the connection 19d along an inner surface 13e of the pillar 13 and extends frontward from the lid 19a along the inner surface 13e of the pillar 13. The outer wall 19c extends downward from the inner end of the connection 19d in the vehicle lateral direction along the outer surface 13b of the pillar 13. As illustrated in FIG. 2, the outer wall 19c also extends frontward from the lid 19a beyond the boundary B along a bottom edge 17b of the frame molding 17 between the outer surface 13b and the inner surface 17a. A front part 19c1 of the outer wall 19c covers the end surface 11c2 of the upright wall 11c of the upper frame 11 and the lower end 16a of the weld bead 16. As is seen in FIGS. 2 and 4, the front part 19c1 of the outer wall 19c is located not above but below a vertically intermediate position of the gap g between the upright wall 11c and the frame molding 17. As illustrated in, for example, FIGS. 2, 4, and 5, a lower end 19c2 of the outer wall 19c projects downward beyond the bottom edge 17b of the frame molding 17 and is exposed to the outside in the vehicle lateral direction. That is, the outer wall 19c stands between the outer surface 13b of the pillar 13, and the lower inner surface 17a and the bottom edge 17b of the frame molding 17. As illustrated in FIG. 2, the connection 19d penetrates through a cutout 13d, formed in the upper rear end of the pillar 13, in the vehicle lateral direction and connects the inner wall 19b and the outer wall 19c to each other. The connection 19d is located above a lower side 13d1 of the cutout 13d. The outer wall 19c is an example of an intervenient part. The rear end 17c is an example of an end.

Figure 8:
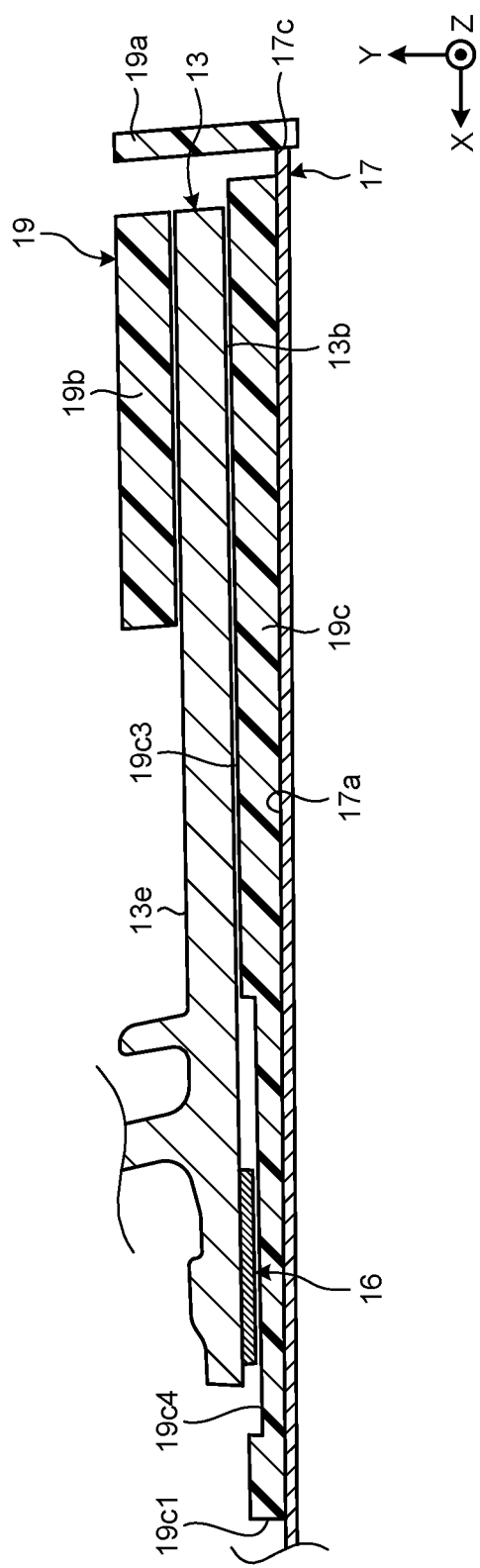
FIG. 8 is a sectional view taken along the line VIII-VIII of FIG. 2.

FIG. 8 is a sectional view taken along the line VIII-VIII of FIG. 2. As illustrated in, for example, FIGS. 5 and 8, the outer wall 19c of the end cap 19 is provided with a recess 19c4 in an inner surface 19c3 to accommodate the weld bead 16. The recess 19c4 serves to prevent interference between the weld bead 16 and the outer wall 19c.

In the present embodiment, the lower end 16a of the weld bead 16 is spaced upward from the lower edge 11c3 of the upright wall 11c as illustrated in FIG. 4, and the upper end 16b of the weld bead 16 is spaced downward from the upper edge 11c4 of the upright wall 11c as illustrated in FIG. 5.

Suppose that the lower end 16a of the weld bead 16 reach the lower edge 11c3 of the upright wall 11c or the upper end 16b of the weld bead 16 reach the upper edge 11c4 of the upright wall 11c. In such a case, in the vicinity of the lower edge 11c3 or the upper edge 11c4, a peripheral component around the upright wall 11c of the upper frame 11 such as the frame molding 17 or the end cap 19 is located closer to the upright wall 11c. Thus, the weld bead 16 may interfere with the peripheral component, causing the peripheral component to be lifted up or swelled or hindering proper attachment of the peripheral component. This may lead to additional manufacturing work and time for largely cutting the weld bead 16, for example. In this regard, according to the present embodiment as described above, the lower end 16a of the weld bead 16 is spaced upward from the lower edge 11c3 of the upright wall 11c and the upper end 16b of the weld bead 16 is spaced downward from the upper edge 11c4 of the upright wall 11c. According to the present embodiment, for example, it is thus possible to prevent the weld bead 16 from affecting peripheral components. Furthermore, for example, it is possible to eliminate the need for accurately trimming the weld bead 16 in order to prevent interference between the weld bead 16 and peripheral components. In the present embodiment, the weld bead 16 has the lower end 16a spaced upward from the lower edge 11c3 of the upright wall 11c, and the upper end 16b spaced downward from the upper edge 11c4 of the upright wall 11c. However, the weld bead 16 may have at least one of the lower end 16a and the upper end 16b as above. In the case of the weld bead 16 with the lower end 16a spaced upward from the lower edge 11c3, it is possible to avoid the lower end 16a from interfering with the peripheral components, and eliminate the necessity to largely cut the lower end 16a additionally. Likewise, in the case of the weld bead 16 with the upper end 16b spaced downward from the upper edge 11c4, it is possible to avoid the upper end 16b from interfering with the peripheral components, and eliminate the necessity to largely cut the upper end 16b additionally. In the case of the upright wall 11c having the lower edge 11c3 and the upper edge 11c4 of a curved or angular form, the weld bead 16, if located close to the lower edge 11c3 and the upper edge 11c4, may be required to be machined in accordance with the curved or angular shape, which will further increase time and cost for the finishing process of the weld bead 16. In this regard, according to the present embodiment, the weld bead 16 is spaced from the lower edge 11c3 or the upper edge 11c4, so that no increase in time and cost for the finishing process occurs.

In the present embodiment, as illustrated in FIG. 4, the lower end 16a of the weld bead 16 is spaced upward from a lower boundary b1 between the curved surface 11c31 and the outer surface 11c1, and the upper end 16b of the weld bead 16 is spaced downward from an upper boundary b2 between the curved surface 11c41 and the outer surface 11c1. By such an arrangement, the lower end 16a can be spaced further from the lower edge 11c3 of the upright wall 11c, and the upper end 16b can be spaced further from the upper edge 11c4 of the upright wall 11c. This can prevent the weld bead 16 from exerting an influence on the peripheral components, for example. In addition, it is possible to avoid the weld bead 16 from being additionally cut in order to prevent interference with the peripheral components. In the present embodiment, the weld bead 16 has the lower end 16a spaced upward from the lower boundary b1, and the upper end 16b spaced downward from the upper boundary b2. However, the weld bead 16 may have at least one of the lower end 16a and the upper end 16b as above. In the case of the weld bead 16 having the lower end 16a spaced apart upward from the lower boundary b1, it is possible to avoid the lower end 16a from interfering the peripheral components and from being additionally cut greatly. In the case of the weld bead 16 having the upper end 16b spaced apart downward from the upper boundary b2, it is possible to avoid the upper end 16b from interfering the peripheral components and from being additionally cut greatly.

In the present embodiment, as described above, ahead of the weld bead 16, the sponge 18 (intervenient object) is interposed between the outer surface 11c1 (second outer surface) of the upper frame 11 and the inner surface 17a of the frame molding 17. By such an arrangement, the sponge 18 works to ensure the gap between the outer surface 11c1 and the inner surface 17a, which can reduce an influence of the weld bead 16 on a peripheral component such as the frame molding 17, for example.

Furthermore, such an arrangement can eliminate the necessity for greatly cutting the weld bead 16 for the purpose of preventing interference between the weld bead 16 and the frame molding 17. The intervenient object is not limited to the sponge 18 and can be implemented by various materials, shapes, and the like. Furthermore, the attachment method of the intervenient object is not limited to adhesive bonding to the upper frame 11.

In the present embodiment, as described above, the end cap 19 includes the lid 19a and the outer wall 19c (intervenient object). The lid 19a covers the rear end 17c (end) of the frame molding 17. The outer wall 19c stands between the outer surface 13b (first outer surface) and the inner surface 17a. That is, the end cap 19 including the outer wall 19c as an intervenient part can ensure the gap between the outer surface 13b and the inner surface 17a, which makes it possible to reduce an influence of the weld bead 16 on the frame molding 17 being a peripheral component in a simpler structure or at less cost, than, for example, addition of a separate component. This also eliminates the necessity for greatly trimming the weld bead 16 to prevent interference between the weld bead 16 and the frame molding 17, for example.

In the present embodiment, as described above, the weld bead 16 extends in an oblique direction intersecting the vertical direction and the horizontal direction. That is, the features of the present embodiment as described above are applicable to the weld bead 16 extending in an oblique direction intersecting the vertical direction and the horizontal direction.

In the present embodiment, the upper frame 11 includes the protrusion 11d2 (hook) that catches the weather strip 31. In this connection, as illustrated in FIG. 5, a first position P1 is defined to be opposite to the upper end 16b of the weld bead 16 across the upright wall 11c. A second position P2 is defined to be opposite to the upper boundary b2 across the upright wall 11c. The first position P1 is located between the second position P2 and an upper surface 11d21 of the protrusion 11d21. Of an inner surface 11e of the upper frame 11, a region 11e1 above the upper surface 11d21 of the protrusion 11d2 is to become a sealing surface of the weather strip 31 (FIG. 3). If the first position P1 matches or is above the second position P2, melted welding materials may enter in the region 11e1 at the time of welding, which makes it difficult to ensure the sealing performance of the weather strip 31. In this respect, in the present embodiment the first position P1 is set between the second position P2 and the upper surface 11d21 of the protrusion 11d2, that is, below the second position P2. Thereby, for example, melted welding materials are unlikely to enter in the region 11e1 at the time of welding and affect the sealing performance of the weather strip 31. In the present embodiment, the first position P1 is set between the second position P2 and the upper surface 11d21. However, it is not limited to such an example. The first position P1 may be set below the upper surface 11d21. Also in this case, melted welding materials can be prevented from entering into the region 11e1.

Furthermore, in the present embodiment, the welded part includes the weld bead 16 projecting outward from the outer surfaces 11c1 and 13b in the vehicle lateral direction. By such a structure, the welded part can be improved in rigidity and strength owing to the weld bead 16 projecting from the outer surfaces 11c1 and 13b, for example, as compared with the welded part with no weld bead 16.

Figure 9:
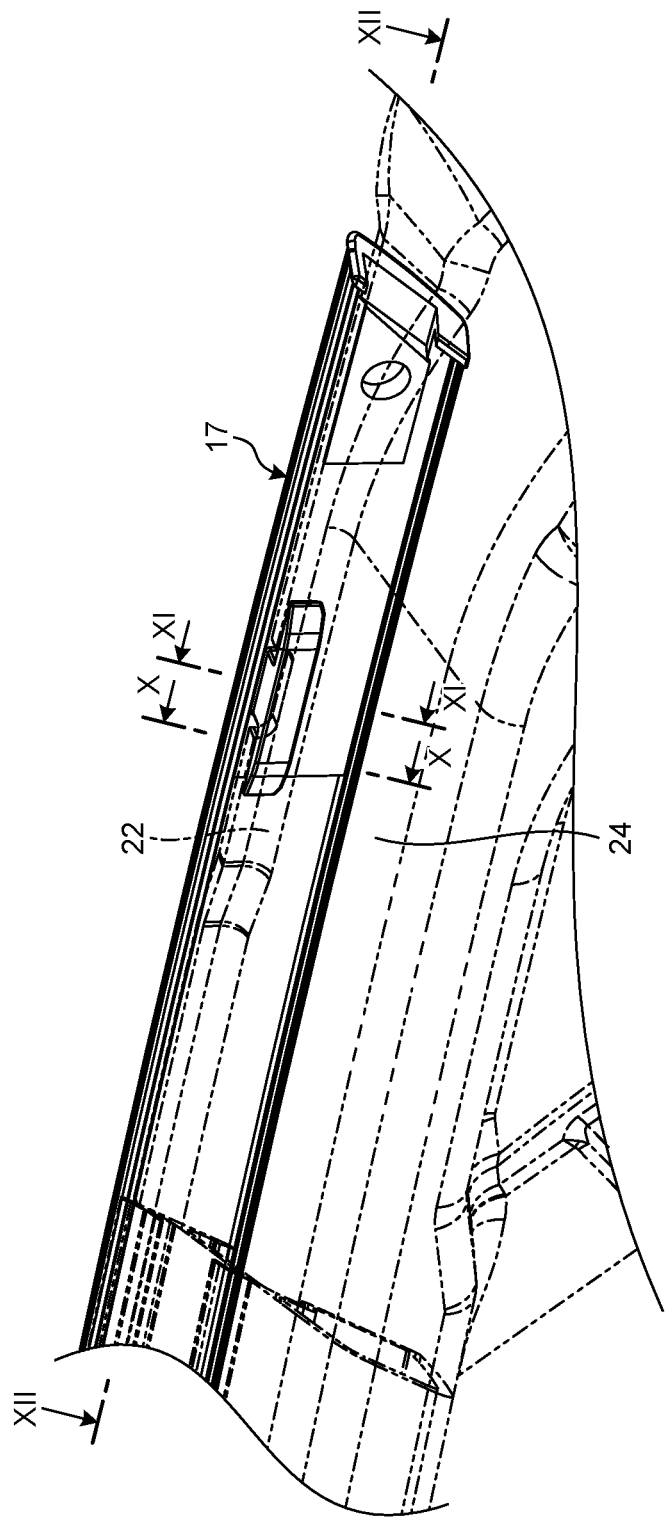
FIG. 9 is a schematic and exemplary perspective view of the part IX of the vehicle door frame according to the embodiment as viewed from the outside of the vehicle in the lateral direction.
Figure 10:
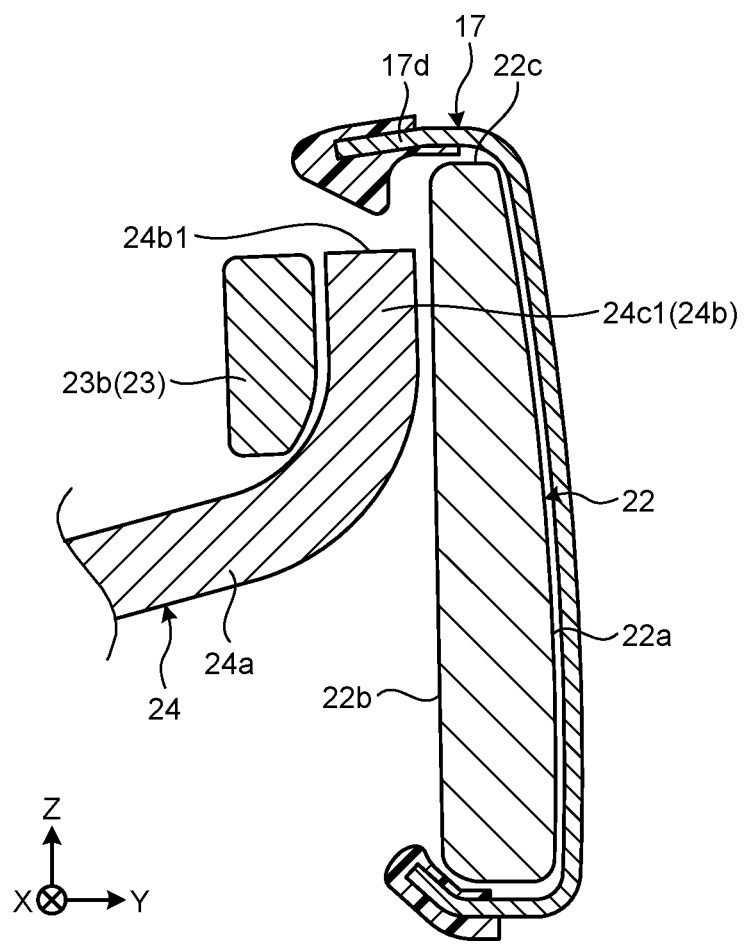
FIG. 10 is a sectional view taken along the line X-X of FIG. 9.
Figure 11:
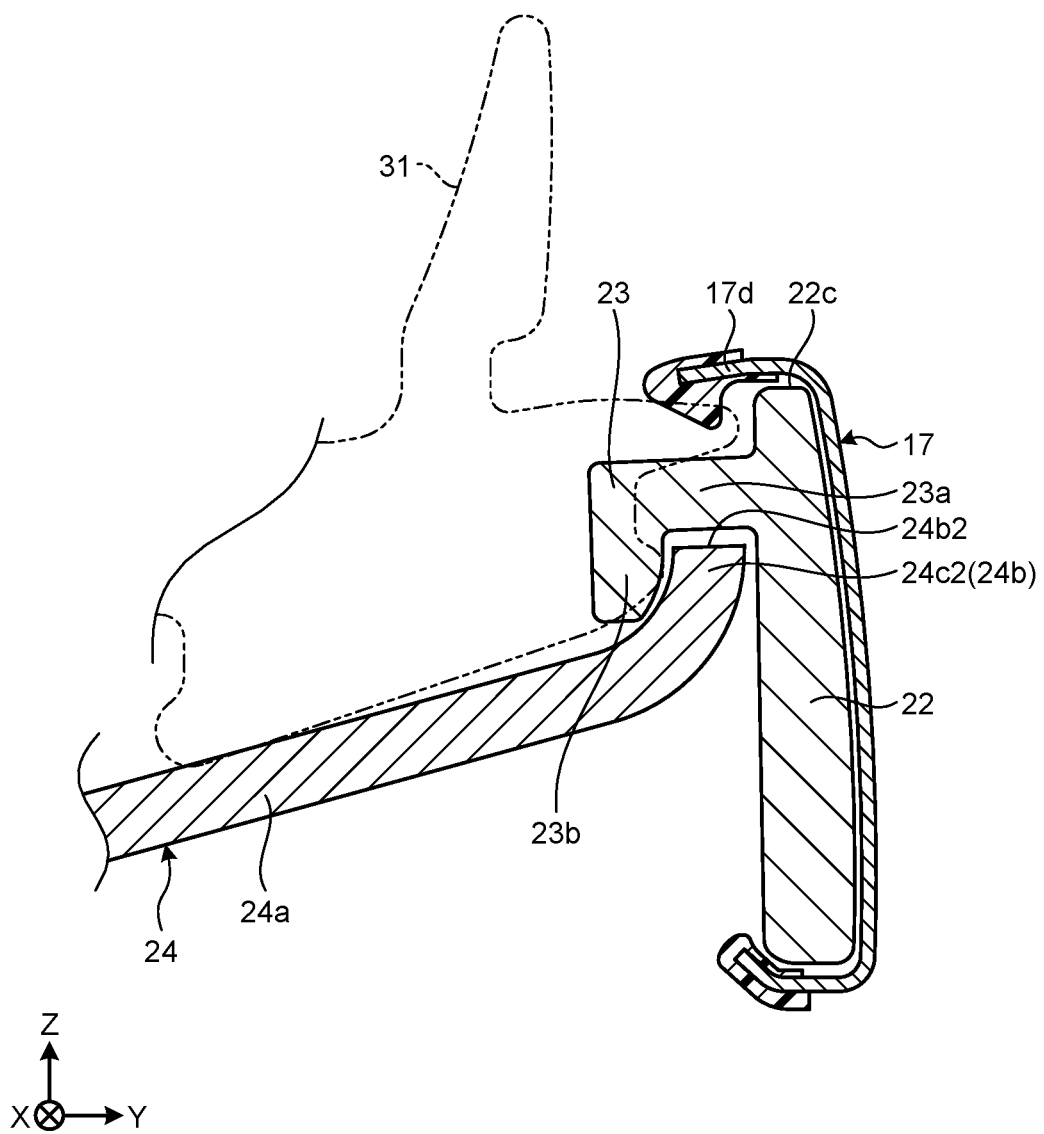
FIG. 11 is a sectional view taken along the line XI-XI of FIG. 9.

Next, the structure of a part IX of FIG. 1 is described. FIG. 9 is a perspective view of the part IX of FIG. 1; FIG. 10 is a sectional view taken along the line X-X of FIG. 9; FIG. 11 is a sectional view taken along the line XI-XI of FIG. 9; and FIG. 12 is a sectional view taken along the line XII-XII of FIG. 9.

Figure 12:
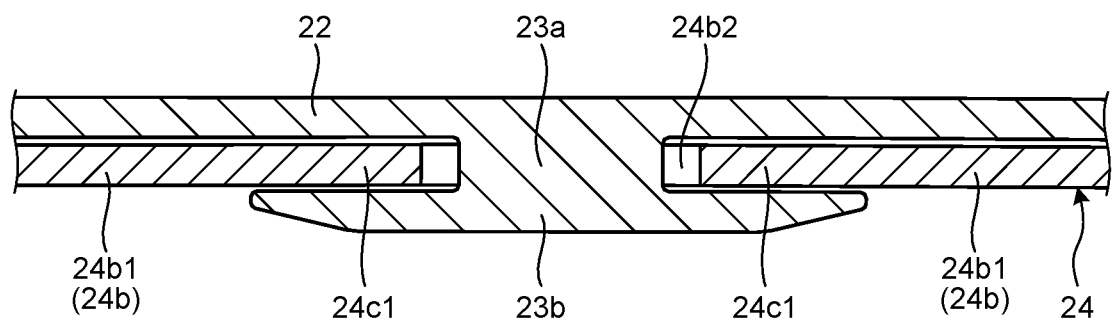
FIG. 12 is a sectional view taken along the line XII-XII of FIG. 9.

As illustrated in FIGS. 10 to 12, a supporting member 21 includes an upright wall 22 and a protrusion 23. The upright wall 22 extends, having a vertically long cross section, and has an outer surface 22a and an inner surface 22b. The protrusion 23 is located in an intermediate position of the upright wall 22 in the longitudinal direction and projects inward from the inner surface 22b of the upright wall 22 in the vehicle lateral direction. The protrusion 23 includes a base 23a projecting inward in the vehicle lateral direction and a hook 23b extending frontward, rearward, and downward from the end of the base 23a. The base 23a and the hook 23b form a T-shaped structure together.

A corner piece 24 has a plate-like shape and includes a base 24a extending in an oblique direction, that is, inclined slightly upward toward the outside in the vehicle lateral direction, and an edge 24b of a hook form curved upward at the outer end of the base 24a in the vehicle lateral direction. An end surface 24b1 of the edge 24b extends along the upper edge 22c below an upper edge 22c of the upright wall 22 of the supporting member 21. The end surface 24b1a is provided with a cutout 24b2 cut downward to accommodate the base 23a of the protrusion 23. As illustrated in FIGS. 10 and 12, first contiguous parts 24c1 are contiguous to the cutout 24b2 of the edge 24b in the longitudinal direction of the supporting member 21 and interposed between the upright wall 22 and the hook 23b. As illustrated in FIG. 11, a second contiguous part 24c2 is contiguous to the cutout 24b2 of the edge 24b from below and interposed between the upright wall 22 and the hook 23b beneath the base 23a. As illustrated in FIG. 12, the two first contiguous parts 24c1 are contiguous to each other across the cutout 24b2 of the edge 24b and holds the base 23a in-between them in the longitudinal direction. As illustrated in FIG. 11, the weather strip 31 is held between an upper wall 17d of the frame molding 17 and the base 23a.

The protrusion 23 can function to position the corner piece 24 in the vertical direction and in the vehicle lateral direction and position the supporting member 21 in the longitudinal direction. The protrusion 23 can also function, together with the frame molding 17, as a hook for the weather strip 31. According to such a structure, the supporting member 21 and the structure of the front part of the front door frame 1 can be relatively simplified, as compared with the ones having separate protrusions for positioning the corner piece 24 in the respective directions.

While certain embodiments have been described, these embodiments have been presented by way of example only, and are not intended to limit the scope of the inventions. Indeed, the embodiments described herein may be embodied in different other forms; various omissions, substitutions, combinations, and changes may be made without departing from the spirit of the inventions. These embodiments and modifications are incorporated in the scope and spirit of the inventions and in the accompanying claims and their equivalents. Specifications of the elements and shapes (structure, kind, direction, form, size, length, width, thickness, height, number, arrangement, position, location, material, etc.) can be modified and carried out as appropriate.

For example, examples of the welded part include the one with a weld bead (projection) lower in height or removed through a finishing process. Further, for example, the structure of the upper corner in the above embodiment is applicable to the upper front corner of a rear door.

The invention claimed is:
1. A vehicle door frame comprising:
a pillar having
a first abutting surface being located at an upper corner of a vehicle door, and
a first outer surface facing outward in a lateral direction of a vehicle;
an upper frame having
a second abutting surface being located at the corner and abutting against the first abutting surface,
a second outer surface facing outward in the lateral direction of the vehicle, being adjacent to the first outer surface, and being a flat surface or an outwardly curved surface in the lateral direction of the vehicle,
an upper end surface being an upwardly curved surface smaller in radius of curvature than the second outer surface, and forming an upper edge of the upper frame,
a lower end surface being a downwardly curved surface smaller in radius of curvature than the second outer surface, and forming a lower edge of the upper frame,
an upper boundary between the second outer surface and the upper end surface, and
a lower boundary between the second outer surface and the lower end surface;
a frame molding extending along the upper frame to cover an outside of the upper frame in the lateral direction of the vehicle, and having an inner surface facing the first outer surface and the second outer surface with a gap;
a welded part being located at a boundary between the first outer surface and the second outer surface, extending along the first abutting surface and the second abutting surface, facing the inner surface of the frame molding, and bonding the pillar and the upper frame together; and
an end cap including:
a lid that covers an end of the frame molding, and
an intervenient part being interposed between at least one of the first outer surface and the second outer surface and the inner surface of the frame molding, wherein
the welded part has a weld bead and at least one of an upper end and a lower end,
the upper end being spaced downward from the upper edge and located at or below the upper boundary,
the lower end being spaced upward from the lower edge and located at or above the lower boundary,
the upper frame includes a closed cross section, a bridging wall, and an upright wall,
the bridging wall adjoins an outside of the closed cross section in the lateral direction of the vehicle,
the upright wall adjoins an outside of the bridging wall in the lateral direction of the vehicle,
the second outer surface is an outer surface of the upright wall in the lateral direction of the vehicle,
the upright wall extends vertically and in a longitudinal direction of the upper frame,
the upper frame includes a hook that catches a weather strip, the hook projecting inward in the lateral direction of the vehicle from the upright wall, the hook located below the upper edge of the upright wall,
the upright wall includes a sealing surface for sealing a gap between the weather strip and the upright wall, the sealing surface being above the upper surface of the hook and below the upper boundary,
the weld bead projects outward in the lateral direction of the vehicle,
the gap between the frame molding and the upper frame decreases as going upward, the intervenient part has a plate-like shape, extends frontward from the lid along a bottom edge of the frame molding between the first outer surface and the inner surface of the frame molding, and covers the lower end of the welded part, the end cap is provided with a cutout above the intervenient part, the upper end of the welded part being exposed to outside of the intervenient part through the cutout so that the inner surface of the frame molding faces the upper end of the welded part through the cutout.

2. The vehicle door frame according to claim 1, further comprising
an intervenient object being spaced apart from the second abutting surface and interposed between the second outer surface and the inner surface of the frame molding.

3. The vehicle door frame according to claim 1, wherein the welded part extends in an oblique direction intersecting a vertical direction and a horizontal direction.

4. The vehicle door frame according to claim 1 wherein
the intervenient part is provided with a recess in an inner surface of the intervenient part, and
the lower end of the welded part is accommodated in the recess so that the welded part is spaced from the intervenient part in the lateral direction of the vehicle.

* * * * *